United States Patent
Gringoire et al.

(10) Patent No.: US 8,877,325 B2
(45) Date of Patent: Nov. 4, 2014

(54) COATED FILMS

(71) Applicant: Jindal Films Americas LLC, Macedon, NY (US)

(72) Inventors: Bruno R. Gringoire, Rachecourt (BE); David A. Liestman, Walworth, NY (US)

(73) Assignee: Jindal Films Americas, LLC, Macedon, NY (US)

( * ) Notice: Subject to any disclaimer, the term of this patent is extended or adjusted under 35 U.S.C. 154(b) by 19 days.

(21) Appl. No.: 13/712,226

(22) Filed: Dec. 12, 2012

(65) Prior Publication Data

US 2013/0189501 A1 Jul. 25, 2013

Related U.S. Application Data

(60) Provisional application No. 61/590,417, filed on Jan. 25, 2012.

(51) Int. Cl.

| | | |
|---|---|---|
| *B41M 5/00* | (2006.01) | |
| *B44C 1/17* | (2006.01) | |
| *G03G 7/00* | (2006.01) | |
| *C09D 133/00* | (2006.01) | |
| *B32B 27/20* | (2006.01) | |
| *B32B 27/30* | (2006.01) | |
| *B32B 27/08* | (2006.01) | |
| *B32B 27/40* | (2006.01) | |
| *B32B 27/28* | (2006.01) | |
| *B32B 7/02* | (2006.01) | |
| *C08J 7/00* | (2006.01) | |
| *C08J 7/04* | (2006.01) | |
| *C08J 5/18* | (2006.01) | |
| *C09D 175/04* | (2006.01) | |
| *C09D 11/101* | (2014.01) | |

(52) U.S. Cl.
CPC ............... *C09D 133/00* (2013.01); *C08J 7/042* (2013.01); *B32B 27/20* (2013.01); *C08J 5/18* (2013.01); *C01P 2004/61* (2013.01); *B32B 27/302* (2013.01); *B32B 27/08* (2013.01); *B32B 27/40* (2013.01); *C09D 175/04* (2013.01); *B32B 27/28* (2013.01); *B32B 7/02* (2013.01); *C09D 11/101* (2013.01); *B32B 27/306* (2013.01); *C08J 7/00* (2013.01)
USPC ........ 428/195.1; 428/206; 428/212; 428/219; 428/220; 428/341; 428/423.1; 428/500

(58) Field of Classification Search
CPC .......... B32B 7/02; B32B 27/08; B32B 27/20; B32B 27/28; B32B 27/302; B32B 27/306; B32B 27/40; C01P 2004/61; C08J 5/18; C08J 7/042; C09D 11/101; C09D 175/04
USPC .............. 428/195.1, 206, 212, 219, 220, 341, 428/423.1, 500
See application file for complete search history.

(56) References Cited

U.S. PATENT DOCUMENTS

| | | | |
|---|---|---|---|
| 5,662,985 | A | 9/1997 | Jensen et al. |
| 5,789,123 | A | 8/1998 | Cleckner et al. |
| 6,844,034 | B2 | 1/2005 | Touhsaent |
| 2003/0203136 | A1* | 10/2003 | Takeuchi ...................... 428/32.6 |
| 2003/0207121 | A1* | 11/2003 | McGee ....................... 428/422.8 |
| 2004/0109997 | A1 | 6/2004 | Li et al. |
| 2007/0248810 | A1 | 10/2007 | McGee et al. |
| 2008/0081160 | A1 | 4/2008 | Anderle et al. |
| 2010/0209599 | A1* | 8/2010 | Van Veen et al. .......... 427/126.1 |

FOREIGN PATENT DOCUMENTS

| | | |
|---|---|---|
| DE | 19740757 | 3/1999 |
| EP | 0 782 932 | 7/1997 |
| EP | 0 878 320 | 11/1998 |
| EP | 1 326 910 | 7/2003 |
| WO | 02/12405 | 2/2002 |
| WO | 2009/035453 | 3/2009 |
| WO | WO 2011/100029 | 8/2011 |
| WO | 2011/129964 | 10/2011 |

OTHER PUBLICATIONS

Ag Ames Goldsmith Corp. Development Product Release: Nov. 2007.*

* cited by examiner

*Primary Examiner* — Betelhem Shewareged

(57) ABSTRACT

Disclosed is a coating composition and coated film having the coating composition adhered thereto in which the coating composition comprises particulate filler; binder composition comprising acrylic polymer and ethylene acrylic acid copolymers; non-cross-linking adhesion promoter; and optionally urethane polymer, styrene-acrylic copolymer, or a combination thereof; and wherein cross-linker(s) are substantially absent from the composition; and wherein the coated film has a 45° Gloss (ASTM D2457) of less than 30 or 25 or 20 or 15. The coated film is useful for pressure sensitive labels for thermal transfer ribbon printing labels.

13 Claims, No Drawings

COATED FILMS

CROSS-REFERENCE TO RELATED APPLICATION

This application claims priority to and the benefit of U.S. Ser. No. 61/590,417, filed Jan. 25, 2012, incorporated herein by reference.

FIELD OF THE INVENTION

The present invention relates in general to a water based clay filled coating demonstrating low gloss, excellent ink adhesion and print quality as well as an excellent Thermal Transfer Ribbon receptive surface. The resulting film may be coated on the opposite side with an appropriate adhesive receptive coating that can be used in Pressure Sensitive Labels applications.

BACKGROUND

Matte water based coated films typically require the utilization of large clay or calcium carbonate particles size (>10 μm) and whitening agent(s) like titanium dioxide to provide a satin or matte paper-like appearance. Typical clay filled coatings are abrasive and as a result can cause increased manufacturing costs due to coating equipment wear. Utilization of expensive ceramic coated doctor blades demonstrating a few hours lifetime is typical with more conventional clay filled coating. Reverse Direct Gravure ("RDG") technology will require ceramic engraved gravure rolls and coating speed is limited because of high shear viscosity. Other coating technologies such as mayer rod (smooth or wire wound) coaters can accommodate such abrasive coatings; however, coating smoothness is very difficult to achieve because of long scratch or trough-like continuous defects in the coating surface caused by particulates that are trapped on the rod. In addition, particulate settling requires continuous stirring of the coating composition in order to prevent variability of the film properties such as surface roughness and gloss.

What is needed is a film coating that is easy to produce—with little or no settling of particulate fillers in the coating composition—in addition to excellent printability in appearance and with adequate adhesion. It is particularly desirable to have an improved Thermal Transfer Ribbon ("TTR") receptive surface for wax, wax/resin, and resin type thermal transfer ribbons.

Relevant publications include the following: EP 1 326 910 A1; EP 0 878 320; EP 0 782 932; U.S. Pat. No. 6,844,034; U.S. Pat. No. 5,789,123; U.S. Pat. No. 5,662,985; US 2008/0081160; US 2007/248810; US 2004/0109997; and WO 2011/100029.

SUMMARY

Disclosed herein are coating compositions comprising an aqueous emulsion of particulate filler, binder composition comprising acrylic polymer and ethylene acrylic acid copolymers, non-cross-linking adhesion promoter, and optionally urethane polymer, styrene-acrylic copolymer, or a combination thereof, and wherein cross-linker(s) and organic solvents are substantially absent from the composition.

Also disclosed are films having a coating composition adhered thereto in which the coating composition comprises particulate filler; binder composition comprising acrylic polymer and ethylene acrylic acid copolymers; non-cross-linking adhesion promoter; and optionally urethane polymer, styrene-acrylic copolymer, or a combination thereof; and wherein cross-linker(s) are substantially absent from the composition; and wherein the coated film has a 45° Gloss (ASTM D2457) of less than 30 or 25 or 20 or 15.

Also disclosed is a method of coating a film comprising suspending in water (most preferably, a medium consisting of water) a coating composition comprising particulate filler, binder composition comprising acrylic polymer and ethylene acrylic acid copolymers; non-cross-linking adhesion promoter, and optionally urethane polymer, styrene-acrylic copolymer, or a combination thereof; and wherein cross-linker(s) are substantially absent from the composition; applying a layer of the suspended coating composition onto a film; removing the water from the adhered layer of coating composition; and forming a coated film having a dry weight of the coating composition within the range of from 0.50 or 0.80 or 1.0 g/m$^2$ to 3.0 or 4.0 or 5.0 or 6.0 g/m$^2$ and a 45° Gloss (ASTM D2457) of less than 30 or 25 or 20 or 15.

DETAILED DESCRIPTION

The present invention is a coated film having a matte or paper-like finish that can be readily printed upon with conventional, UV, and/or TTR inks and ribbons. The film can be most any type of polymeric film, preferably a polypropylene-based film and most preferably an oriented polypropylene film having one, two, three, or more layers, having the coating composition adhered thereto. The coating creates the matte appearance and printability of the film. The coating composition includes at least one or more particulate fillers, a binder component, at least one adhesion promoter, and optionally a matte finish component. The coated films get their matte appearance from the particulate fillers, but the inventors have found that, preferably, when a matte finish component such as a urethane polymer is added, less particulate filler is needed to achieve the desired matte finish.

The matte finish and feel of the coated films can be characterized by the Gloss (ASTM D2457) of the coated film. Preferably, the coated film has a 45° Gloss of less than 30 or 25 or 20 or 15. Furthermore, the coating on the film is relatively light, preferably the dry weight of the coating composition on the film is within the range of from 0.50 or 0.80 or 1.0 g/m$^2$ to 3.0 or 4.0 or 5.0 or 6.0 g/m$^2$.

The coating composition used to coat the films is an emulsion and/or suspension in an aqueous medium, wherein organic solvents are substantially absent. By "organic solvents" what is meant are typical solvents known in the art such as tetrahydrofuran or other ethers, isopropyl alcohol and other alcohols that are liquid at room temperature, alkanes that are liquid at room temperature (e.g., hexane), liquid ketones (e.g., acetone, methyl ethyl ketone) and aldehydes, and other common solvents known in the art. Such organic solvents are preferably substantially absent from the coating composition, meaning that they are not present to any detectable level, or, if present at all, are present to less than 0.1 wt % or 0.5 wt % or 1 wt % of the coating composition.

Also absent from the coating compositions and coated films are cross-linking agents or "cross-linkers." Examples of cross-linkers include those compounds known in the art that are reactive at room temperature towards polyolefin, polyacrylate, or polyurethane polymers in promoting or affecting intra- or inter-molecular cross-linking. Examples of such cross-linkers include melamine formaldehyde, polyfunctional aziridine compounds, isocyanates, zinc ammonium carbonate, zirconium carbonate, polyfunctional carbodiimide compounds, and/or oxirane (preferably epoxy) compounds. Such cross-linkers are described in, for example, EP 1 326 910 A1.

Preferably, whitening agents are also absent from the composition as the coating composition will have a desirable light or white finish without whiteners. Thus, preferably, whiteners such as titanium dioxide or other oxide metals are substantially absent, meaning they are not present to any measureable level in the coating of the film or coating composition or, if present at all, are present to less than 0.5 wt % or 1 wt % of the coating composition.

Thus, the invention can be described as a film having a coating composition adhered thereto, or "coated film," in which the coating composition comprises (or consists essentially of, or consists of in a most preferred embodiment) particulate filler, a binder composition preferably comprising acrylic polymer and ethylene acrylic acid copolymers, non-cross-linking adhesion promoter(s), and optional matte finish components, preferably urethane polymer, styrene-acrylic copolymer, or a combination thereof, wherein cross-linker(s) are substantially absent from the composition, and wherein the coated film has a 45° Gloss (ASTM D2457) of less than 30 or 25 or 20 or 15.

The inventive coated film is prepared by adhering an aqueous dispersion (or emulsion or suspension) of the various components onto the desired polymeric film and then removing the water from the composition to form the coated film. In a preferred embodiment, there may be a primer in between the polymeric film and the inventive coating to improve its adhesion to the polymeric film.

The various components of the coating composition and how it is made are described in more detail below.

Particulate Filler

The "particulate filler" is any composition that is insoluble in water and thus forming an opaque or translucent suspension, and having an average particle size of less than 10 µm or 8 µm or 5 µm or 2 µm or 1 µm. Or, stated as ranges, the particulate filler may have an average particle size within the range from 0.050 µm or 0.10 µm or 0.2 µm or 0.5 µm to 2 µm or 5 µm or 8 µm or 10 µm. The particulate filler may be inorganic or organic, or some combination thereof; and can be natural or synthetic, or a combination of the two. In a preferred embodiment, the particulate filler is a silica-alumina oxide based compound having the desired particle size.

As long as the average particle size is within the ranges stated herein, other clays may also be used. Other particulate filler may comprise a particulate dispersion of at least one of silica (Syloid W500 and W900 grades from Grace Davison—those grades are specially designed for water based coatings), alumina, titanium dioxide, calcium carbonate, sodium magnesium fluorosilicate, synthetic hectorite, bentonite, montmorillonite, kaolinite clays, alkaline polyphosphate, talc, alkaline silicate salts, water glass (salts of potassium, lithium, and/or sodium, such as sodium silicate), surface-modified silica, surface-modified alumina, surface-modified titanium dioxide, surface-modified calcium carbonate, surface-modified talc, and mixtures thereof. Exemplary suitable alkaline polyphosphates may include at least one of tetrasodium pyrophosphate, sodium hexametaphosphate, sodium tripolyphosphate, disodium acid pyrophosphate, hexasodium tetra-polyphosphate, and tetrapotassium polyphosphate, including mixtures thereof. Most preferred clays are kaolinite clays such as Lithosperse™ 7015 HS and 7005 CS by Huber Engineering Minerals.

The particulate filler, which is preferably a clay, is typically present in an amount, on a dry weight basis, within the range from 30 wt % or 40 wt % or 45 wt % or 50 wt % to 65 wt % or 70 wt % or 75 wt %, based on the total weight of the coating composition. When the urethane polymer or styrene-acrylic copolymer is present, the particulate filler is present in the coating composition, on a dry weight basis, within the range from 30 wt % or 35 wt % or 40 wt % to 45 wt % or 50 wt % or 55 wt %, based on the total weight of the coating composition. Thus, in preferred embodiments a matte-producing component, such as a urethane polymer and/or styrene-acrylic copolymer, will offset the need for the particulate filler, which is advantageous for the equipment used to dispense the filler.

Binder Component

The coating compositions described herein typically include two or more acrylic-based polymers, typically sold and prepared as a suspension or emulsion, and used as such in the inventive coating compositions. As used herein, such "acrylic-based polymers" are polymers that include at least one unsaturated ester moiety. Examples of acrylic-based polymers are those polymers with one or more "unsaturated ester moiety", for example, comprising an organo species comprising one or more "hydrocarbylidenylcarbonyloxy" functional groups, analogous, and/or derived moieties, for example, moieties comprising (meth)acrylate functionalities and/or derivatives thereof "Unsaturated ester moieties" may comprise optionally substituted generic α,β-unsaturated acids, esters, and/or other derivatives thereof.

Preferred unsaturated ester moieties are those represented by the Formula (I): $R^1R^2C=CR^3-OCOR^4$, where $R^1$, $R^2$, $R^3$, and $R^4$ each independently represent —H (hydrogen), optionally substituents, and/or optionally substituted organo groups; and all suitable isomers thereof, combinations thereof on the same species, and/or mixtures thereof. More preferred moieties of Formula (I) (including isomers and mixtures thereof) are those when $R^1$, $R^2$, $R^3$, and $R^4$ are independently selected from: —H, optional substituents and optionally substituted $C_{1-10}$ hydrocarbyl, most preferably —H, hydroxyl, amino and $C_{1-6}$ hydrocarbyl, for example, —H, —OH, and $C_{1-4}$ alkyl.

When $R_1$ and $R_2$ are —H and $R^3$ is H, Formula (I) represents an acrylate moiety, which includes acrylate esters and derivatives thereof. When $R^1$ and $R^2$ are —H and $R^3$ is methyl, Formula (I) represents a methacrylate moiety which includes methacrylate esters and derivatives thereof. Acrylate and/or methacrylate moieties of Formula (I) are particularly preferred. Conveniently, moieties of Formula (I) are those where $R^1$ and $R^2$ are independently —H, methyl, or —OH, and $R^3$ is —H or methyl.

More conveniently, moieties of Formula (I) are those where $R^1$ is —OH, $R^2$ is methyl, and $R^3$ is —H, and/or tautomer(s) thereof (for example, of an acetoacetoxy functional species). Most convenient unsaturated ester moieties are selected from: —OCO—CH=CH$_2$; —OCO—C(CH$_3$)=CH$_2$; acetoacetoxy, —OCO—CH=C(CH$_3$)(OH), and all suitable tautomer(s) thereof. It will be appreciated that any suitable moieties represented by Formula (I) could be used in the context of this invention such as other reactive moieties.

In a preferred embodiment, the inventive coating compositions include a binder composition comprising acrylic polymer and ethylene acrylic acid copolymer. In a most preferred embodiment, the binder consists of an acrylic polymer and an ethylene acrylic acid copolymer. Commercial examples of suitable acrylic polymers are NeoCryl™ acrylic emulsions from NeoResins, and in particular, NeoCryl XK-90 acrylic emulsions. Preferably, the Brookfield viscosity, at 25° C., of the acrylic polymer emulsion is within the range of from 1 cPs or 10 cPs or 20 cPs or 30 cPs to 125 cPs or 150 cPs or 200 cPs or 300 cPs.

Commercial examples of suitable ethylene acrylic acid copolymers ("EAA") are Primacor™ copolymers from Dow, in particular, such copolymers that include within the range of from 10 wt % or 15 wt % to 30 wt % or 35 wt % or 40 wt % acrylic acid derived units in the polymer. These polymers are also typically sold and prepared as an emulsion in water, with ammonia and/or alkali ions, and specific examples include Primacor 5980 and other similar polymers. The polymers can also be solid, and preferred copolymers have a Vicat softening point within the range of from 25° C. or 30° C. or 35° C. to 45° C. or 50° C. or 55° C. or 60° C. When referring to "ethylene acrylic acid copolymers" (plural), included are ethylene acrylic acid copolymer, as well as ethylene methacrylic acid copolymer, and $C_{1-6}$ esters (ester derivatives) of each. In a most preferred embodiment, however, the binder includes ethylene acrylic acid copolymer, or "EAA."

The EAA component can also be an ionomer, which are well known in the art. In a particular embodiment, the acrylic acid component is an ionomer comprising from 60 wt % or 65 wt % to 80 wt % or 85 wt % or 90 wt % or 95 wt % of ethylene derived units and balance of the polymer being acrylic, methacrylic acid, $C_{1-6}$ esters of each, or combinations thereof, along with a metal ion or ammonia associated therewith.

Preferably, the acrylic polymer is present in the coating composition, on a dry weight basis, within the range of from 5 wt % or 10 wt % or 15 wt % to 20 wt % or 25 wt % or 30 wt % or 35 wt %, based on the total weight of the coating composition. Also, preferably the coating composition comprises, on a dry weight basis, within the range from 5 wt % or 7 wt % to 15 wt % or 20 wt % or 25 wt % of the ethylene acrylic acid copolymer, based on the total weight of the coating composition.

Adhesion Promoter

One or more non-crosslinking adhesion promoters are also present in the inventive coating composition and coated films. Adhesion promoters are well known compounds to enhance the adhesion of a composition that would form a film or coating on some substrate to that substrate. A "non-crosslinking" adhesion promoter is one that is not chemically reactive as in forming intra- or intermolecular covalent bonds.

Preferably, the coating composition comprises, on a dry weight basis, within the range from 0.5 wt % or 1 wt % or 2 wt % to 5 wt % or 8 wt % or 10 wt % of the non-crosslinking adhesion promoter, based on the total weight of the coating composition. Preferably, the adhesion promoter is selected from the group consisting of ethylenically unsaturated acrylates and $C_{1-6}$ esters thereof; aceto-acetoxy-ethylmethacrylate and $C_{1-6}$ esters thereof; maleic anhydride grafted polymers (e.g., maleic anhydride grafted polypropylene or polyethylene); and mixtures thereof. In a most preferred embodiment, the adhesion promotor is aceto-acetoxy-ethylmethacrylate and $C_{1-6}$ esters thereof, and even more preferably, is aceto-acetoxy-ethylmethacrylate ("AAEM").

Matte Finish Components

Optional components to the coating composition are so called matte finish components. These are polymeric components that add or enhance the paper-like look and feel of a polymeric film surface. In a preferred embodiment, the coating composition, or coating on the film, include at least one matte finish component. Preferred examples of such polymeric compounds are urethane polymers and styrene-acrylic copolymers. Thus, a preferred embodiment of the inventive coating composition includes urethane polymer, styrene-acrylic copolymer, or a combination thereof.

The term "polyurethane" or "urethane polymer" as used herein comprises urethane homopolymers, mixtures of polyurethanes with other polymers (polyurethane blends) and/or copolymers comprising a urethane (carbamate) repeat unit and one or more other repeat unit(s) such as acrylate(s). Polyurethanes as used herein may denote those comprising free or blocked isocyanate groups. Blocked isocyanate groups on those reacted with suitable known blocking agents such that (e.g., after heating) the blocked isocyanate dissociates to generate free isocyanate groups e.g., available to react with suitable acid or polyol groups to form a polyurethane polymer chain or network. Preferably, the urethane polymer useful in the invention is used in the form of an aqueous emulsion or suspension or "latex" form.

Specific urethane polymers that may be used in the present invention comprise very hard urethane such as that available commercially from UCB Chemicals under the trade designation DW 4860. Other suitable urethane polymers include Neorez™ R1020 and others from DSM Neoresins.

The urethane polymers of the present invention may be formed, for example, using monoisocyanates and polyisocyanates. The isocyanates may be linear aliphatic, cyclic aliphatic, aromatic, and mixtures thereof. Examples of commercially available polyisocyanates include Vestanat™ isophorone diisocyanate from HULS America Inc. (Piscataway, N.J.), TMXDT™ which is tetramethylxylene diisocyanate from Cyanamid (Wayne, N.J.), Luxate™ HM which is hexamethylene diisocyanate from Olin Corporation (Stamford, Conn.), diphenylmethane diisocyanate from Upjohn Polymer Chemicals (Kalamazoo, Mich.), Desmodur™ W which is dicyclohexylmethane-4,4'-diisocyanate from Bayer Corporation (Pittsburgh, Pa.), and toluene diisocyanate. The preferred isocyanates are hexamethylene diisocyanate ("HDI"), isophorone diisocyanate, and mixtures thereof, more preferably HDI trimer.

The urethane polymers useful in the invention may be produced by reaction with polymeric diols and/or polyester polyols. Such polyols may have hydroxyl numbers in a range from 20 to 140, and preferably from 40 to 110. Suitable polymeric polyols may include polyester polyols, polyether polyols, polycarbonate polyols, polyurethane polyols, polyacetal polyols, polyacrylate polyols, polycaprolactone polyols, polyesteramide polyols, polythioether polyols, and mixtures thereof.

Alkylene diols may also be used in the preparation of useful polyurethanes. The alkylene diols may have hydroxyl numbers in a range from 130 to 1250, and preferably from 950 to 1250. The preferred alkylene diols include 1,4-butanediol, 1,6-hexanediol and 2-methyl-1,3-propanediol and may be present in the polyurethane in a range from 0.1 wt % to 10.0 wt %, and preferably from 0.5 wt % to 5.0 wt %, based on 100 part total polymer solids.

Higher functional polyols may be used in the preparation of useful polyurethane-urea polymers. Suitable examples include glycerol, trimethylolpropane, 1,2,4-butane-triol, 1,2, 6-hexane-triol, and mixtures thereof. The preferred higher functional polyol is trimethylolpropane. The polyols may be present in a range from 0.1 wt % to 1.0 wt %, and preferably from 0.3 wt % to 0.7 wt %, based on 100 parts total polyurethane solids.

Optionally, dihydroxy carboxylic acids may be used when preparing the polyurethane prepolymer. A preferred dihydroxy carboxylic acid is dimethylolpropionic acid. The dihydroxy carboxylic acid component may be present in a range from 0.05 wt % to 1.0 wt %, and preferably from 0.2 wt % to 0.5 wt %, based on 100 parts total polyurethane solids.

Neutralization of the dihydroxy carboxylic acid groups can be accomplished with compounds such as alkali metal hydroxides, organic tertiary amines, ammonia, and mixtures thereof. Preferred neutralizing agents are sodium hydroxide and triethylamine.

Another matte finish polymer may be used such as a styrene-acrylic copolymer or derivative thereof. This is another "acrylate-based polymer" as described for the binder components above, but a specific embodiment useful as a matte finish component. These polymers, when included or used as a coating composition on the surface of substrates, produce a low gloss matte finish. A commercial example of a suitable styrene-acrylic copolymer is Joncryl™ 1680, or Joncryl 1680 blended with Joncryl 74.

The styrene-acrylic copolymers are typically milky emulsions which can be diluted to any desired level. A desirable styrene-acrylic copolymer emulsion preferably has a Brookfield viscosity at 25° C. within the range of from 100 cPs or 150 cPs or 200 cPs to 300 cPs or 350 cPs or 400 cPs, or can be a higher viscosity such as within a range of from 500 cPs or 600 cPs or 800 cPs to 1000 cPs or 2000 cPs or 3000 cPs. The glass transition temperature, Tg, for preferred styrene-acrylic copolymers is within the range of from 10° C. or 20° C. or 30° C. to 40° C. or 60° C. or 80° C.; and for another class of useful styrene-acrylic copolymers the glass transition temperature is within the range of from 80° C. or 90° C. to 110° C. or 120° C. or 130° C.

The styrene content of the copolymer can vary from 10 wt % of the copolymer up to 90 wt % of the copolymer, and is preferably within the range of from 20 wt % or 30 wt % to 60 wt % or 70 wt % of the copolymer, or for another type of copolymer, the styrene content is within the range of from 50 wt % or 60 wt % to 80 wt % or 90 wt %.

Preferably, the urethane polymer or styrene-acrylic copolymer is present in the coating composition, on a dry weight basis, within the range from 5 wt % or 10 wt % to 15 wt % or 20 wt % or 25 wt %, based on the total weight of the coating composition. Most preferably, when the urethane polymer or styrene-acrylic copolymer is present, the particulate filler is present in the coating composition, on a dry weight basis, within the range from 30 wt % or 35 wt % or 40 wt % to 45 wt % or 50 wt % or 55 wt %, based on the total weight of the coating composition. Most preferably, the matte finish component is a urethane polymer present in these desirable ranges.

Primer

In some circumstances it may be advantageous to apply a primer to one or both sides of the film before applying the coating composition. Generally, any primer layer commonly used in the art could be used and included in films according to this invention, so long as the chosen primer bonds adequately to the polymeric film and coating formulation when exposed to conditions of intended use, such as hot water. Exemplary primers may include water-based epoxies prepared and applied according to Steiner, et al. in U.S. Pat. No. 4,214,039 and cationic amino-functional polymers described by McGee in U.S. Pat. No. 6,596,379. Other specific examples may include amino-functional acrylics such as NeoCryl™ XK-90 or water-based urethanes like NeoRez R-610, manufactured by DSM NeoResins (Waalwijk, The Netherlands). Preferably, however, the films do not require a primer layer on either surface of the polymeric film. If used, primer layers should be relatively thin, with application levels yielding between 0.05 g/m$^2$ and 1.0 g/m$^2$ of dried primer. A more preferred range for primers may be between 0.1 g/m$^2$ and 0.5 g/m$^2$.

Some suitable primers for use in embodiments of the invention include an iminated acrylic, a poly(ethyleneimine), an epoxy, or a polyurethane. Where the primer composition includes a cross-linking agent, any cross-linking agent capable of cross-linking the ionomer to a desirable degree may be used. Particularly suitable cross-linking agents comprise a carboxyl-reactive functionality. Thus, in some embodiments, at least one of the first and second cross-linking agents comprises a carboxyl-reactive cross-linking agent. The amount of cross-linking is not critical; however, in some embodiments 5 wt % to 35 wt % of the acid groups are cross-linked.

Coated Film

The coating composition described above is useful for coating polymeric films. The polymeric films or "films" referred to herein generally include two opposing sides or surfaces. One surface of the film is referred to as, e.g., a top-side, front-side, or print-side of the film and is the side that is typically opposite the side of the film that is adjacent the article when the film is used as a label or opposite a side of the film that is adjacent a product when the film is used as a packaging film. The other surface of the film may typically be referred to as the back-side, e.g., an adhesive-receiving side, of the film and is typically the side of the film that is adjacent the article, product, or the side of the film that receives the labeling adhesive when the film is used to form a label.

The term "polymeric film" or "film" as used herein may be defined broadly to include any polymer or thermoplastic material comprising one or more monomers as a component thereof, preferably oriented polymeric film structures. The polymeric film may be monolayer or multilayer films, including oriented, coextruded, and laminated multilayer films, and may preferably be biaxially oriented films. The polymeric film may also comprise other non-thermoplastic or non-polymeric materials, such as paper, cardstock, and/or metallic or nonmetallic films, and/or they may be laminated to such non-thermoplastic materials, such as paper, metallic, or non-metallic films. The polymeric film includes the polymeric portion plus any non-thermoplastic components that make up the structural composition of the film. The polymeric film may include any clear, matte, cavitated, or opaque film. Many preferred embodiments may comprise an opaque or white film with substantially non-matte surfaces.

The preferred polymeric film is a polyolefin film and more preferably a biaxially oriented, multi-layer, or monolayer polyolefin-based film comprising polypropylene, polyethylene, and/or polybutylene homo-, co-, or terpolymers. Other thermoplastic films or layers may also be present within such film embodiments, such as polyesters. However, in other embodiments, the polymeric film can include substantially any thermoplastic material that forms a thin film that can be employed for packaging, labeling, or decoration. Other exemplary suitable materials may include nylon, polyethylene terephthalate, polylactic acid, and polycarbonate. The contemplated films also include coextrudates of the foregoing materials, laminates of any two or more of these materials or interblends of any of the materials extruded as a single base film. Polyolefin homopolymers and copolymers of propylene and ethylene may be most useful in many labeling applications. One particularly preferred polymeric film that is suitable as a facestock for labeling is a polypropylene-based film containing at least 80 wt % of isotactic polypropylene in at least a primary or core layer. Exemplary commercially available materials include ExxonMobil 4252 and Fina (Total) 3371.

The polymeric film may be coextruded with at least one skin layer or it may be laminated to at least one other film. Typically, when the film is coextruded the thickness of a skin layer may range from 2% to 18% of the total film thickness. Multilayer films having three or more layers, e.g., five layers and sometimes even seven layers, are contemplated. Five-layer films may include a core layer, two skin layers, and an intermediate layer between the core layer and each skin layer, such as disclosed in U.S. Pat. No. 5,209,854 and U.S. Pat. No. 5,397,635. The skin layers may include a copolymer (i.e., a polymer comprising two or more different monomers) of propylene and another olefin such as ethylene and/or 1-butene.

Another exemplary preferred film is a multilayer polypropylene film comprising at least one of polyethylene, polypropylene, copolymer of propylene and ethylene, copolymer of ethylene and 1-butene, terpolymers of any of the foregoing, and maleic anhydride modified polymers. Another useful film comprises polypropylene interblended with a minor proportion of at least one of polyethylene, copolymers of ethylene and an alpha olefin, copolymers of propylene and an alpha olefin, terpolymers of olefins and maleic anhydride modified polymers. Multilayer, white opaque, cavitated polypropylene-based films may also be a useful film. Such films are described in U.S. Pat. No. 4,758,462; U.S. Pat. No. 4,965,123; and U.S. Pat. No. 5,209,884.

The polymeric film may also be treated and/or metallized on at least one side. Many preferred polypropylene polymer-film embodiments may be treated on both sides to improve adherence of the print-side coating and the adhesive to the adhesive-receiving surface. Treatment may typically comprise corona, plasma, or flame treatment. In some embodiments, treatment may also comprise applying a primer to a surface of the polymeric film to improve adhesion between the film and the back-side coating and/or the polymeric surface layer. Such treatments may facilitate uniform wetting of the coatings and/or increase surface energy to improve coating anchorage to the film. The surface treatment typically may be applied after orientation, "in-line" on the coating equipment, though primers may typically be applied using coating equipment. Some embodiments may possess skin layers that do not require surface treatment for acceptable coating, ink, or adhesive adherence, such as layers comprising copolymers of ethylene and/or homopolymers of polyethylene, e.g., medium or high density polyethylene. Metallization may be by vacuum deposition of aluminum or other metals. A print-face coating and printing ink may also be applied to the metallized or treated surface.

The polymeric films may be uniaxially oriented, or simultaneously or sequentially biaxially oriented. A typical range of orientation stretches the film 4 to 10 times its original dimension in the machine direction and 7 to 12 times its original dimension in the transverse direction. The thickness of oriented polymeric films is not critical and typically ranges from 10 μm to 100 μm.

The coated film is a film having the coating composition adhered thereto, preferably as a uniform thin layer. As previously stated, the coated film preferably has a 45° Gloss (ASTM D2457) of less than 30 or 25 or 20 or 15. Also, the dry weight of the coating composition on the film is preferably within the range of from 0.50 or 0.80 or 1.0 g/m² to 3.0 or 4.0 or 5.0 or 6.0 g/m². The coated films of the invention are preferably flexible and bendable.

Preferably, a method of coating the film comprises suspending in water a coating composition comprising, as described above, the various components, preferably particulate filler, binder composition comprising acrylic polymer and ethylene acrylic acid copolymers; non-cross-linking adhesion promoter, and optionally urethane polymer, styrene-acrylic copolymer, or a combination thereof; and wherein cross-linker(s) are substantially absent from the composition; then applying a layer of the suspended coating composition onto a film as to achieve the desired amount of dried coating on the film. The film can be coated by any desirable means known in the art such as by gravure drums, spraying or otherwise exposing the film surface to an aqueous emulsion or suspension of all the components. The coating composition, upon application to at least one side of the film will desirably adhere to the film. Coating composition may be applied more than once to achieve the desired amount of coating on the film. The side being coated may preferably be pretreated as by coronal or flame treatment, and/or may have a primer pre-applied thereto.

Each component is preferably suspended in water to the desired solids level to make a suspension or emulsion of each component. The components, while being stirred or otherwise in a well dispersed state are blended together through conventional means. The combined components then form the coating composition which can then be well dispersed prior to applying to the film surface.

Once the film has wet coating composition adhered thereto, the water is removed from the adhered layer of coating composition. This can be achieved by any suitable means such as by evaporation through heating, lowered pressure, UV or other radiative exposure, or some combination of these. In any case, the desired result is forming a coated film having a dry weight of the coating composition within the range of from 0.50 or 0.80 or 1.0 g/m² to 3.0 or 4.0 or 5.0 or 6.0 g/m² and a 45° Gloss (ASTM D2457) of less than 30 or 25 or 20 or 15. In a most preferred embodiment, the water is removed by heating the film having suspended coating adhered thereto to a temperature of from 100° C. to 108° C. or 110° C. or 112° C. or 115° C. Air, preferably heated air, may also be gently blown onto the coated film, as in an air floatation oven.

In a preferred embodiment, the adhering step comprises adhering a layer of the suspended coating composition onto a primer layer adhered to the film, the primer layer comprising a compound or compounds described above, most preferably an iminated acrylic polymer, a polyethyleneimine, an epoxy, a polyurethane, or a mixture thereof.

The coated films are particularly useful as pressure sensitive labels for food packaging. Thus, the coated film can be formed into a label by application of an adhesive to at least part of the film. Preferably, the label is capable of being printed upon or is printed upon by a thermal transfer ribbon printer and/or UV ink.

EXAMPLES

All example coating compositions were made by combining and mixing through conventional means suspensions or emulsions of the basic ingredients in aqueous medium listed in Table 1 and below. After coating on the films, the coated films were heated in an oven to a temperature of 110° C. until all of the water had evaporated from the coated surface of the film. The films were cooled and then tested for printability.

Several pilot coater trials were conducted demonstrating very good fitness for use response as follows. In the hereunder examples summarized in Table 1, the following was kept constant:

Base film: ExxonMobil 60LH242 white opaque cavitated polypropylene film;
Primer: NeoCry XK90 at 0.12 g/m²;
Clay was Lithosperse 7005CS from KaMin Performances Materials;
Binder is made of a blend of XK90 and EAA;
 XK90 is an iminated acrylic polymer from DSM Neoresins;

Primacor ethylene acrylic acid copolymer (EAA) is from Dow with 20% AA;

AAEM (aceto-acetoxy-ethylmethacrylate) was used as the adhesion promoter from Sigma Aldrich; and Neorez R1020 is polyurethane based latex with poor coalescence characteristics from DSM Neoresins.

Film properties and Fitness For Use requirements were evaluated as follows:

Reflective Gloss at 45° following ASTM D2457;

Solvent based ink adhesion is a commercial nitrocellulose/acrylic ink Pluricel from Flint Italy;

UV ink adhesion by tape test was tested for UV flexo and UV letter press. Several tapes were applied three times to the same printed area and pulled off the surface. The surface and tape were then rated for the percentage of the ink remaining on the surface of the film. The tapes used in the testing were Scapa, 3M 600 tape, and 3M 810 tape (magic tape);

Water based inks were tested applied on a commercial ROTO brand press and ink adhesion was tested with 3M 600 and 3M 810 tape;

TTR performance tests consisted of utilizing both near and flat head TTR (Thermal Transfer Ribbon) type printers. For example, Zebra 140 Xi iii and IV, Zebra ZM400 (flat head printers), and Toshiba SX4 and TEC B-SX4T near edge printers.

The formulations outlined in Table 1 were tested for UV ink adhesion and for TTR performance. The level of the coating composition on each example film was 2 g/m$^2$. The following ratios in Table 1 are expressed in dry weight %. Gloss is expressed in gloss units at a 45° measurement angle. For UV flexo adhesion, ink % remaining of the film after tape test is recorded. Print quality is expressed on a scale from 1 to 3, where 1 is the best. For TTR (Thermal Transfer Ribbon), readability may be expressed on a scale from 1 to 5, where 5 is the best.

TABLE 1

Example 1-5 coating compositions (wt %) and print test results

| No. | Clay | Acrylic polymer | EAA | AAEM | Urethane polymer | Gloss @ 45 deg | UV flexo adh. | Print quality | TTR flat head | TTR near edge |
|---|---|---|---|---|---|---|---|---|---|---|
| 1 | 55.1 | 28.3 | 13.8 | 2.8 | 0 | 19 | 97 | 1 | 5 | 5 |
| 2 | 64 | 20 | 12.8 | 3.2 | 0 | 11 | 90 | 1 | 5 | 5 |
| 3 | 61.7 | 22.6 | 12.3 | 3.4 | 0 | 13 | 87 | 1 | 5 | 5 |
| 4 | 68 | 20.2 | 9.7 | 2.2 | 0 | 11 | 100 | 1 | 5 | 5 |
| 5 | 48 | 24.5 | 11.9 | 2.4 | 13.4 | 13 | 100 | 1 | 5 | 5 |

As summarized in Tables 2 through 5, Examples 4 and 5 were tested for their ability to accept TTR printing and resist chemicals. The rating is done by ANSI scan for each TTR ribbon, including scan ratings after smudge and scratch utilizing an AB-301 Colorfast Tester (Sangyo Co.). A score of "A" is best, and "C" is adequate. TTR print results were obtained for flat and near edge. Print Temperature setting range for Zebra 140Xi III printer was 1 to 30, which refers to the setting and not the temperature. Print Temperature setting range for TEC B-SX4T printer was −10 to +10. For Example 4, print results could not be obtained for TRX-50 and R510 ribbons. For Example 5, print results could not be obtained for TRX-50, TR4500 and M260 ribbons.

TABLE 2

Print Test results of Example 4

| RIBBON | TR4085plus | TRX-55 | M260 | TR4070 | R300 | R316 | TR4500 |
|---|---|---|---|---|---|---|---|
| RIBBON TYPE | Wax | Wax/Resin | | | Resin | | Near Edge Wax/Resin |
| PRINTER | Zebra 140 Xi III | | | | | | TEC B-SX4T |
| PRINT TEMPERATURE (° C.) | 9 | 10 | 8 | 25 | 22 | 10 | 0 |
| PRINT SPEED, inch/sec | 6 | 6 | 6 | 6 | 6 | 6 | 6 |
| DENSITY | 2.1 | 1.91 | 1.8 | 1.84 | 1.93 | 2.04 | 1.79 |
| *ANSI SCAN BEFORE SMUDGE | A | A | B | A | A | A | A |
| ANSI SCAN AFTER SMUDGE | C | B | B | B | A | A | B |
| *ANSI SCAN BEFORE SCRATCH | A | A | B | A | A | A | A |
| ANSI SCAN AFTER SCRATCH | D | C | B | B | B | C | C |
| ANSI SCAN ROTATED BAR CODE | A | A | A | A | A | A | D |

TABLE 3

Print Test results of Example 5

| RIBBON | TR4085plus | TRX-55 | TR4070 | R300 | R316 | R510 | R390 |
|---|---|---|---|---|---|---|---|
| RIBBON TYPE | Wax | Wax/Resin | Resin | | | | Near Edge Resin |
| PRINTER | | Zebra 140 Xi III | | | | | TEC B-SX4T |
| PRINT TEMPERATURE, (° C.) | 11 | 11 | 25 | 21 | 10 | 25 | 0 |
| PRINT SPEED, inch/sec | 6 IPS | 6 IPS | 4 IPS | 6 IPS | 6 IPS | 6 IPS | 6 IPS |
| DENSITY | 2.08 | 1.92 | 1.86 | 1.89 | 2.01 | 2.31 | 1.94 |
| *ANSI SCAN BEFORE SMUDGE | A | B | B | A | B | A | A |
| ANSI SCAN AFTER SMUDGE | C | B | B | B | B | A | B |
| *ANSI SCAN BEFORE SCRATCH | A | B | B | A | B | A | A |
| ANSI SCAN AFTER SCRATCH | C | B | B | B | B | NA | B |
| ANSI SCAN ROTATED BAR CODE | A | A | A | A | B | A | B |

TABLE 4

Chemical Resistance of Example 4

| RIBBON | TR4085plus | TRX-55 | M260 | TR4070 | R300 | R316 | TR4500 |
|---|---|---|---|---|---|---|---|
| RIBBON TYPE | Wax | Wax/Resin | | Resin | | | Near Edge Wax/Resin |
| PRINTER | | Zebra 140 Xi III | | | | | TEC B-SX4T |
| Isopropyl alcohol | NA | 8/C | NA | 10/NS | 10/D | 10/NS | NA |
| MOTOR OIL | NA | 100/A | NA | 100/A | 100/A | 100/A | NA |
| WATER | 75/A | 100/A | 100/A | 100/A | 100/A | 100/A | 100/A |
| FORMULA 409 ™ | 60/B | 50/A | 40/C | 50/C | 30/C | 40/C | 30/D |
| TIDE ™ DETERGENT | 100/A | 100/A | 100/A | 100/A | 100/A | 100/A | 100/A |

TABLE 5

Chemical Resistance of Example 5

| RIBBON | TR4085plus | TRX-55 | TR4070 | R300 | R316 | R510 | R390 |
|---|---|---|---|---|---|---|---|
| RIBBON TYPE | Wax | Wax/Resin | Resin | | | | Near Edge Resin |
| PRINTER | | Zebra 140 Xi III | | | | | TEC B-SX4T |
| Isopropyl alcohol | NA | 10/NS | 10/NS | 9/NS | 7/NS | 8/C | 3/NS |
| MOTOR OIL | NA | 100/A | 100/A | 100/A | 100/A | 100/A | 5/NS |
| WATER | 100/A | 100/A | 100/A | 100/A | 70/A | 100/A | 40/NS |
| FORMULA 409 ™ | 75/C | 60/B | 30/C | 30/D | 40/C | 35/D | 15/NS |
| TIDE ™ DETERGENT | 100/A | 100/A | 100/A | 100/A | 100/A | 100/A | 20/NS |

Having described the various features of the coating composition and films coated with the coating composition, described here in numbered embodiments are:

1. A coating composition comprising an aqueous emulsion of:
    particulate filler;
    binder composition comprising acrylic polymer and ethylene acrylic acid copolymers;
    non-cross-linking adhesion promoter; and
    optionally urethane polymer, styrene-acrylic copolymer, or a combination thereof;
    and preferably including a urethane polymer or styrene-acrylic copolymer or a combination thereof; most preferably including a urethane polymer; and
    wherein cross-linker(s) and organic solvents are substantially absent from the coating composition.

2. The coating composition of numbered embodiment 1, wherein the average particle size of the particulate filler is less than 10 or 8 or 5 or 2 or 1 μm.

3. The coating composition of numbered embodiments 1 and 2, wherein the particulate filler is present in the coating composition, on a dry weight basis, within the range from 30 wt % or 40 wt % or 45 wt % or 50 wt % to 65 wt % or 70 wt % or 75 wt %, based on the total weight of the coating composition.

4. The coating composition of any one of the previous numbered embodiments, wherein the urethane polymer or styrene-acrylic copolymer is present in the coating composition, on a dry weight basis, within the range from 5 wt % or 10 wt % to 15 wt % or 20 wt % or 25 wt %, based on the total weight of the coating composition.

5. The coating composition of any one of the previous numbered embodiments, wherein when the urethane polymer or styrene-acrylic copolymer is present, the particulate filler is present in the coating composition, on a dry weight basis, within the range from 30 wt % or 35 wt % or 40 wt % to 45 wt % or 50 wt % or 55 wt %, based on the total weight of the coating composition.

6. The coating composition of any one of the previous numbered embodiments, wherein the acrylic polymer is present in the coating composition, on a dry weight basis, within the range from 5 wt % or 10 wt % or 15 wt % to 20 wt % or 25 wt % or 30 wt % or 35 wt %, based on the total weight of the coating composition.

7. The coating composition of any one of the previous numbered embodiments, wherein the ethylene acrylic acid copolymers include ethylene acrylic acid copolymer, ethylene methacrylic acid copolymer, $C_{1-6}$ esters of each, and combinations thereof; and wherein the coating composition comprises, on a dry weight basis, within the range from 5 wt % or 7 wt % to 15 wt % or 20 wt % or 25 wt % of the ethylene acrylic acid copolymer, ethylene methacrylic acid copolymer, $C_{1-6}$ esters of each, or combinations thereof, based on the total weight of the coating composition.

8. The coating composition of numbered embodiment 7, wherein the ethylene acrylic acid copolymer component is an ionomer comprising from 65 wt % to 95 wt % of ethylene derived units and from 5 wt % to 35 wt % acrylic or methacrylic acid, $C_{1-6}$ esters of each, or combinations thereof, and a desirable metal ion or ammonia associated therewith.

9. The coating composition of any one of the previous numbered embodiments, wherein the coating composition comprises, on a dry weight basis, within the range from 0.5 wt % or 1 wt % or 2 wt % to 5 wt % or 8 wt % or 10 wt % of the non-crosslinking adhesion promoter, based on the total weight of the coating composition.

10. The coating composition of any one of the previous numbered embodiments, wherein the adhesion promoter is selected from the group consisting of ethylenically unsaturated acrylates and $C_{1-6}$ esters thereof; aceto-acetoxyethylmethacrylate and $C_{1-6}$ esters thereof; maleic anhydride grafted polymers; and mixtures thereof 11. The coating composition of any one of the previous numbered embodiments, wherein whitening agents are absent.

12. A film having the coating composition of any one of the previous numbered embodiments adhered thereto, wherein the coated film has a 45° Gloss (ASTM D2457) of less than 30 or 25 or 20 or 15.

13. The film of numbered embodiment 12, wherein the dry weight of the coating composition on the film is within the range of from 0.50 or 0.80 or 1.0 g/m² to 3.0 or 4.0 or 5.0 or 6.0 g/m².

14. The film of numbered embodiments 12 and 13, wherein the coating composition is dispersed in water prior to application and organic solvents are substantially absent.

15. The film of any one of the numbered embodiments 12-14, wherein the coated film also comprises a layer of primer between the coating and the film.

16. A label having UV and/or TTR printing thereon comprising the coated film of any one of numbered embodiments 12-15.

17. A method of coating a film with the coating composition of any one of numbered embodiments 1-11 comprising:
suspending in water the coating composition;
applying a layer of the suspended coating composition onto a film;
removing the water from the adhered layer of coating composition; and
forming a coated film having a dry weight of the coating composition within the range of from 0.50 or 0.80 or 1.0 g/m² to 3.0 or 4.0 or 5.0 or 6.0 g/m² and a 45° Gloss (ASTM D2457) of less than 30 or 25 or 20 or 15.

18. The method of numbered embodiment 17, wherein the water is removed by heating the film having suspended coating adhered thereto to a temperature of from 100° C. to 108° C. or 110° C. or 112° C. or 115° C.

19. The method of any one of numbered embodiments 17-18, wherein the coated film is formed into a label by application of an adhesive to at least part of the film.

20. The method of any one of numbered embodiments 17-19, wherein the label is printed upon by a thermal transfer ribbon printer.

Also described herein is the use of the coating composition of any one of numbered embodiments 1-11 in the coating of a film.

Also described herein is the use of the coating composition of any one of numbered embodiments 1-11 in a pressure sensitive and UV and/or TTR printable label.

The invention claimed is:
1. A film having a coating composition adhered thereto, wherein the coating composition comprises:
particulate filler;
binder composition comprising acrylic polymer and ethylene acrylic acid copolymers, wherein the ethylene acrylic acid copolymers include ethylene acrylic acid copolymer, ethylene methacrylic acid copolymer, and $C_{1-6}$ esters of each, or combinations thereof;
non-cross-linking adhesion promoter; and
optionally urethane polymer, styrene-acrylic copolymer, or a combination thereof, and
wherein cross-linker(s) are substantially absent from the coating composition, and
wherein the film having the coating composition has a 45° Gloss (ASTM D2457) of less than 30.

2. The film of claim 1, wherein a dry weight of the coating composition is within a range of from 0.50 g/m² to 6.0 g/m².

3. The film of claim 1, wherein an average particle size of the particulate filler is less than 10 μm.

4. The film of claim 1, wherein the particulate filler is present in the coating composition, on a dry weight basis, within a range from 30 wt % to 75 wt %, based on a total weight of the coating composition.

5. The film of claim 1, wherein the urethane polymer or the styrene-acrylic copolymer, or the combination thereof, is present in the coating composition, on a dry weight basis, within a range from 5 wt % to 25 wt %, based on a total weight of the coating composition.

6. The film of claim 1, wherein when the urethane polymer or the styrene-acrylic copolymer, or the combination thereof is present, then the particulate filler is present in the coating composition, on a dry weight basis, within a range from 30 wt % to 55 wt %, based on a total weight of the coating composition.

7. The film of claim 1, wherein the acrylic polymer is present in the coating composition, on a dry weight basis, within a range from 5 wt % to 35 wt %, based on a total weight of the coating composition.

8. The film of claim 1, wherein the ethylene acrylic acid copolymer component is an ionomer comprising from 65 wt % to 95 wt % of ethylene derived units and from 5 wt % to 35 wt % acrylic or methacrylic acid, $C_{1-6}$ esters of each, or combinations thereof, and a metal ion or ammonia associated therewith.

9. The film of claim 1, wherein the coating composition comprises, on a dry weight basis, within a range from 0.5 wt % to 10 wt % of the non-crosslinking adhesion promoter, based on a total weight of the coating composition.

10. The film of claim 1, wherein the non-cross-linking adhesion promoter is selected from a group consisting of ethylenically unsaturated acrylates and $C_{1-6}$ esters thereof; and $C_{1-6}$ esters derivatives thereof, maleic anhydride grafted polymers, and mixtures thereof.

11. The film of claim 1, wherein the coating composition is dispersed in water prior to application and organic solvents are substantially absent.

12. The film of claim 1, further comprising a layer of primer between the coating composition and the film.

13. A label having printing, UV or otherwise, thereon comprising the film having the coating composition of claim 1.

* * * * *